United States Patent
Wang et al.

(10) Patent No.: US 9,445,125 B2
(45) Date of Patent: Sep. 13, 2016

(54) DEVICE AND METHOD FOR MULTIMEDIA COMMUNICATIONS WITH PICTURE ORIENTATION INFORMATION

(71) Applicant: QUALCOMM Incorporated, San Diego, CA (US)

(72) Inventors: Ye-Kui Wang, San Diego, CA (US); Nikolai Konrad Leung, Takoma Park, MD (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/099,333

(22) Filed: Apr. 14, 2016

(65) Prior Publication Data

US 2016/0227255 A1   Aug. 4, 2016

Related U.S. Application Data

(62) Division of application No. 13/918,477, filed on Jun. 14, 2013.

(60) Provisional application No. 61/682,676, filed on Aug. 13, 2012, provisional application No. 61/662,314, filed on Jun. 20, 2012.

(51) Int. Cl.
*H04N 11/02* (2006.01)
*H04N 19/70* (2014.01)
(Continued)

(52) U.S. Cl.
CPC ............ *H04N 19/70* (2014.11); *H04N 5/2628* (2013.01); *H04N 19/46* (2014.11); *H04N 19/527* (2014.11); *H04N 21/23605* (2013.01); *H04N 21/25825* (2013.01); *H04N 21/41407* (2013.01)

(58) Field of Classification Search
USPC ........................ 375/240.01–240.29
See application file for complete search history.

(56) References Cited

U.S. PATENT DOCUMENTS

| 8,838,911 | B1 * | 9/2014 | Hubin | ...................... H04N 5/76 711/147 |
| 2005/0281444 | A1 * | 12/2005 | Lundberg | ............. A61B 8/5238 382/128 |

(Continued)

FOREIGN PATENT DOCUMENTS

| EP | 2442562 A1 | 4/2012 |
| TW | 201028018 A | 7/2010 |
| WO | WO-2008001441 A1 | 1/2008 |

OTHER PUBLICATIONS

ETSI TS 126 234 v9.3.0, "Universal Mobile Telecommunications System (UMTS); LTE; Transparent End-to-End Packet-switched Streaming Service (PSS); Protocols and Codecs", 3GPP TS 25.212 version 9.3.0 Release 9 (Jun. 2010), 6 pages.

(Continued)

*Primary Examiner* — Dave Czekaj
*Assistant Examiner* — Leron Beck
(74) *Attorney, Agent, or Firm* — Knobbe Martens Olson & Bear LLP

(57) ABSTRACT

Systems, devices, and methods for capturing and displaying picture data including picture orientation information are described. In one innovative aspect, a method for transmitting media information is provided. The method includes obtaining picture or video information, said picture or video information including image data and orientation information of a media capture unit when the picture or video information is obtained. The method further includes encoding said picture or video information, wherein the orientation information is included in a first portion and the image data is included in a second portion, the second portion being encoded and the first portion being distinct from the second portion. The method also includes transmitting the first portion and the second portion.

30 Claims, 7 Drawing Sheets

(51) Int. Cl.

| | |
|---|---|
| *H04N 21/258* | (2011.01) |
| *H04N 21/414* | (2011.01) |
| *H04N 5/262* | (2006.01) |
| *H04N 19/46* | (2014.01) |
| *H04N 19/527* | (2014.01) |
| *H04N 21/236* | (2011.01) |

(56) References Cited

U.S. PATENT DOCUMENTS

| | | | |
|---|---|---|---|
| 2008/0184360 A1* | 7/2008 | Kornilovsky | G06F 3/0362 726/17 |
| 2009/0122159 A1* | 5/2009 | Sakaue | H04N 5/23293 348/231.99 |
| 2010/0162297 A1 | 6/2010 | Lewis et al. | |
| 2011/0228112 A1* | 9/2011 | Kaheel | H04N 1/00127 348/208.4 |
| 2012/0013445 A1* | 1/2012 | Yasuda | G06Q 10/08 340/10.1 |
| 2012/0154386 A1 | 6/2012 | Nagara et al. | |
| 2012/0230429 A1 | 9/2012 | Boyce et al. | |
| 2012/0230594 A1 | 9/2012 | Boyce et al. | |
| 2013/0342762 A1 | 12/2013 | Wang | |

OTHER PUBLICATIONS

Hong D. et al., "Picture Orientation Information", 97. MPEG Meeting; Jul. 18, 2011-Jul. 22, 2011; Torino; (Motion Picture Expert Group or ISO/IEC JTC1/SC29/WG11), No. m20711, Jul. 13, 2011, XP030049274, pp. 1-7.

International Search Report and Written Opinion—PCT/US2013/046163—ISA/EPO—Nov. 4, 2013.

Schulzrinne H. et al., "RFC 2326: Real Time Streaming Protocol", Network Working Group Request for Comments, XX, XX, Apr. 1, 1998, The Internet Society, pp. 1-83.

Schulzrinne H., et al., "RFC 3550, RTP: A Transport Protocol for Real-Time Applications", Network Working Group Request for Comments, XX, XX, No. 1889, Jul. 2003, XP003022794, The Internet Society, pp. 1-89.

Singer D. et al., "Proposed Revised Common Text Multimedia File Format Specification," Projects: 14496-1 Amendment 5, 15444-3 Amendment 1: ISO Base Media File Format, 62. MPEG Meeting; Oct. 21, 2002-Oct. 25, 2002; Shanghai; (Motion Picture Expert Group or ISO/IEC JTC1/SC29/WG11), No. M8900, Oct. 11, 2002, XP030037840, ISSN: 0000-027, pp. 1-50.

Taiwan Search Report—TW102122022—TIPO—Feb. 11, 2015.

Text of ISO/IEC JTC 1/SC 29/WC 1 N2762, "Resolutions of the 28th ISO/IEC JTC 1/SC 29 WG 1 Meeting, Shanghai, China, Oct. 21/25, 2002", WG1, JPEG, Oct. 25, 2002, 11 Pages.

Universal Mobile Telecommunications System (UMTS); LTE; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route Des Lucioles; F-06921 Sophia-Antipolis; France, vol. 3GPP SA, No. V9.3.0, Jun. 1, 2010, XP014047290, pp. 1-178.

Vidyo; Fraunhofer-Institut; Changeset 3008; JCT-VC HEV C; Nov. 8, 2012; pp. 1-5. [downloaded from https://hevc.hhi.fronhofer.de/tradhevc/changeset/2008 on Apr. 8, 2013].

* cited by examiner

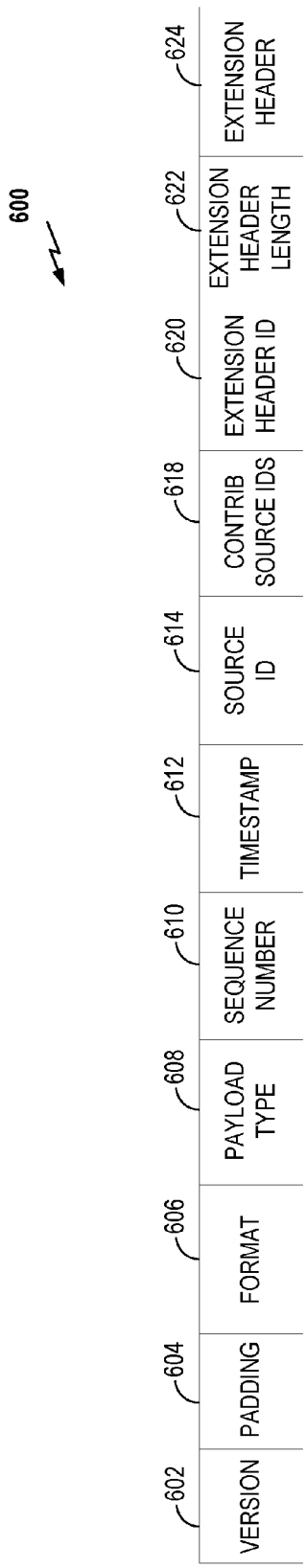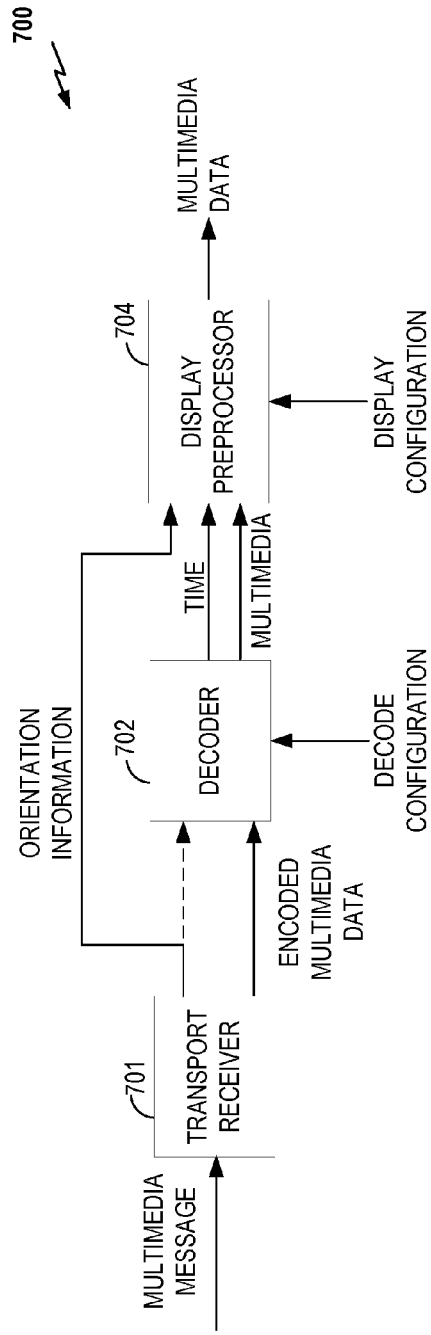
FIG. 6
FIG. 7

DEVICE AND METHOD FOR MULTIMEDIA COMMUNICATIONS WITH PICTURE ORIENTATION INFORMATION

CROSS-REFERENCE TO RELATED APPLICATIONS

This application is a divisional of U.S. patent application Ser. No. 13/918,477, filed on Jun. 14, 2013, entitled "Device and Method for Multimedia Communications with Picture Orientation Information," which claims priority benefit under 35 U.S.C. §119(e) to U.S. Provisional Application No. 61/662,314, filed on Jun. 20, 2012, entitled "Device and Method for Multimedia Communications with Picture Orientation Information," and to U.S. Provisional Patent Application No. 61/682,676, filed on Aug. 13, 2012, entitled "Device and Method for Multimedia Communications with Picture Orientation Information," the disclosures of which are hereby incorporated herein by reference in their entirety. Any and all priority claims identified in the Application Data Sheet, or any correction thereto, are hereby incorporated by reference under 37 C.F.R. §1.57.

BACKGROUND

1. Field

The present invention relates to capturing and displaying picture data, more specifically capturing and displaying picture data including picture orientation information.

2. Background

Recording video on mobile devices allows pictures to be recorded at different orientations as the recording device is rotated. In some cases, the rectangular shape of the picture captured by the camera of a mobile device can make it preferable to orient the camera in a particular direction to better capture the scene information (e.g., landscape vs. portrait). However, without any information about the orientation at which the picture is captured, a display device cannot properly display the picture, e.g., the presentation of the picture may be improperly rotated or upside-down. In some scenarios, the display device cannot be physically rotated by the viewer to compensate for the rotated presentation. For example, a large fixed display like an HDTV cannot be physical rotated. Also, in the case of 2-way video conferencing calls, rotating of the display device would also rotate the camera in the device. This can be undesirable as it rotates the video being sent to the other terminal and prevents the camera from being oriented to better match the scene it is capturing. There is a need for providing information to allow a display device to correctly orient a captured picture before displaying the picture on the display device.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include identification and application of rotation amount and duration to pictures included in a multimedia presentation (e.g., video, sequence of pictures).

In one innovative aspect, a method for displaying media information is provided. The method includes obtaining picture or video information, said picture or video information including at least one output picture and rotation information for the at least one output picture, the rotation information included in a first portion of the picture or video information and the at least one output picture included in a second portion of the picture or video information, the second portion being encoded and the first portion being distinct from the second portion. The method further includes decoding at least one output picture included in the second portion of the picture or video information. The method also includes identifying rotation data and a period for the rotation data based on the rotation information included in the first portion of the picture of video information. The method also includes rotating the decoded at least one output picture in accordance with the identified rotation data and the identified period.

In another innovative aspect, an apparatus for displaying media information is provided. The apparatus includes a memory unit configured to store picture or video information, said picture or video information including at least one output picture and rotation information for the at least one output picture, the rotation information included in a first portion of the picture or video information and the at least one output picture included in a second portion of the picture or video information, the second portion being encoded and the first portion being distinct from the second portion. The apparatus includes a transport layer processor. The transport layer processor is configured to extract rotation data and a period for the rotation data from the rotation information included in the first portion. The transport layer processor is further configured to extract the at least one output picture from the second portion. The apparatus also includes a decoder configured to decode the extracted at least one output picture. The apparatus further includes a presentation processor configured to generate a version of the decoded at least one output picture for display based on the identified rotation data and the identified period.

In a further innovative aspect, a computer readable storage medium comprising instructions executable by a processor of an apparatus is provided. The instructions cause the apparatus to obtain picture or video information, said picture or video information including at least one output picture and rotation information for the at least one output picture, the rotation information included in a first portion of the picture or video information and the at least one output picture included in a second portion of the picture or video information, the second portion being encoded and the first portion being distinct from the second portion. The instructions also cause the apparatus to decode at least one output picture included in the second portion of the picture or video information. The instructions further cause the apparatus to identify rotation data and a period for the rotation data based on the rotation information included in the first portion of the picture of video information. The instructions also cause the apparatus to rotate the decoded at least one output picture in accordance with the identified rotation data and the identified period.

Another innovative apparatus for displaying media information is provided. The apparatus includes means for obtaining picture or video information, said picture or video information including at least one output picture and rotation information for the at least one output picture, the rotation information included in a first portion of the picture or video information and the at least one output picture included in a second portion of the picture or video information, the second portion being encoded and the first portion being distinct from the second portion. The apparatus includes means for processing transport layer information configured to extract rotation data and a period for the rotation data from the rotation information included in the first portion and extract the at least one output picture from the second portion. The apparatus further includes means for decoding configured to decode the extracted at least one output picture. The apparatus also includes means for generating a display configured to generate a version of the decoded at least one output picture for display based on the identified rotation data and the identified period.

In yet another innovative aspect, a method for transmitting media information is provided. The method includes obtaining picture or video information, said picture or video information including image data and orientation information of a media capture unit when the picture or video information is obtained. The method further includes encoding said picture or video information, wherein the orientation information is included in a first portion and the image data is included in a second portion, the second portion being encoded and the first portion being distinct from the second portion. The method also includes transmitting the first portion and the second portion.

An apparatus for transmitting media information is provided in a further innovative aspect. The apparatus includes a media capture unit configured to obtain picture or video information, said picture or video information including image data and orientation information of the media capture unit when the picture or video information is obtained. The apparatus includes an encoder configured to encode said picture or video information, wherein the orientation information is included in a first portion and the image data is included in a second portion, the second portion being encoded and the first portion being distinct from the second portion. The apparatus further includes a transmitter configured to transmit the first portion and the second portion.

In another innovative aspect, a computer readable storage medium comprising instructions executable by a processor of an apparatus is provided. The instructions cause the apparatus to obtain picture or video information, said picture or video information including image data and orientation information of a media capture unit when the picture or video information is obtained. The instructions cause the apparatus to encode said picture or video information, wherein the orientation information is included in a first portion and the image data is included in a second portion, the second portion being encoded and the first portion being distinct from the second portion. The instructions also cause the apparatus to transmit the first portion and the second portion.

In a further innovative aspect, an apparatus for transmitting media information is provided. The apparatus includes means for obtaining picture or video information, said picture or video information including image data and orientation information of a media capture unit when the picture or video information is obtained. The apparatus includes means for encoding said picture or video information, wherein the orientation information is included in a first portion and the image data is included in a second portion, the second portion being encoded and the first portion being distinct from the second portion. The apparatus also includes means for transmitting the first portion and the second portion.

These and other implementations consistent with the invention are further described below with reference to the following figures.

BRIEF DESCRIPTION OF THE DRAWINGS

FIG. 6 illustrates a message diagram for further exemplary encoding of picture orientation information.

FIG. 7 illustrates a functional block diagram of an exemplary decoding device.

Figure 1:
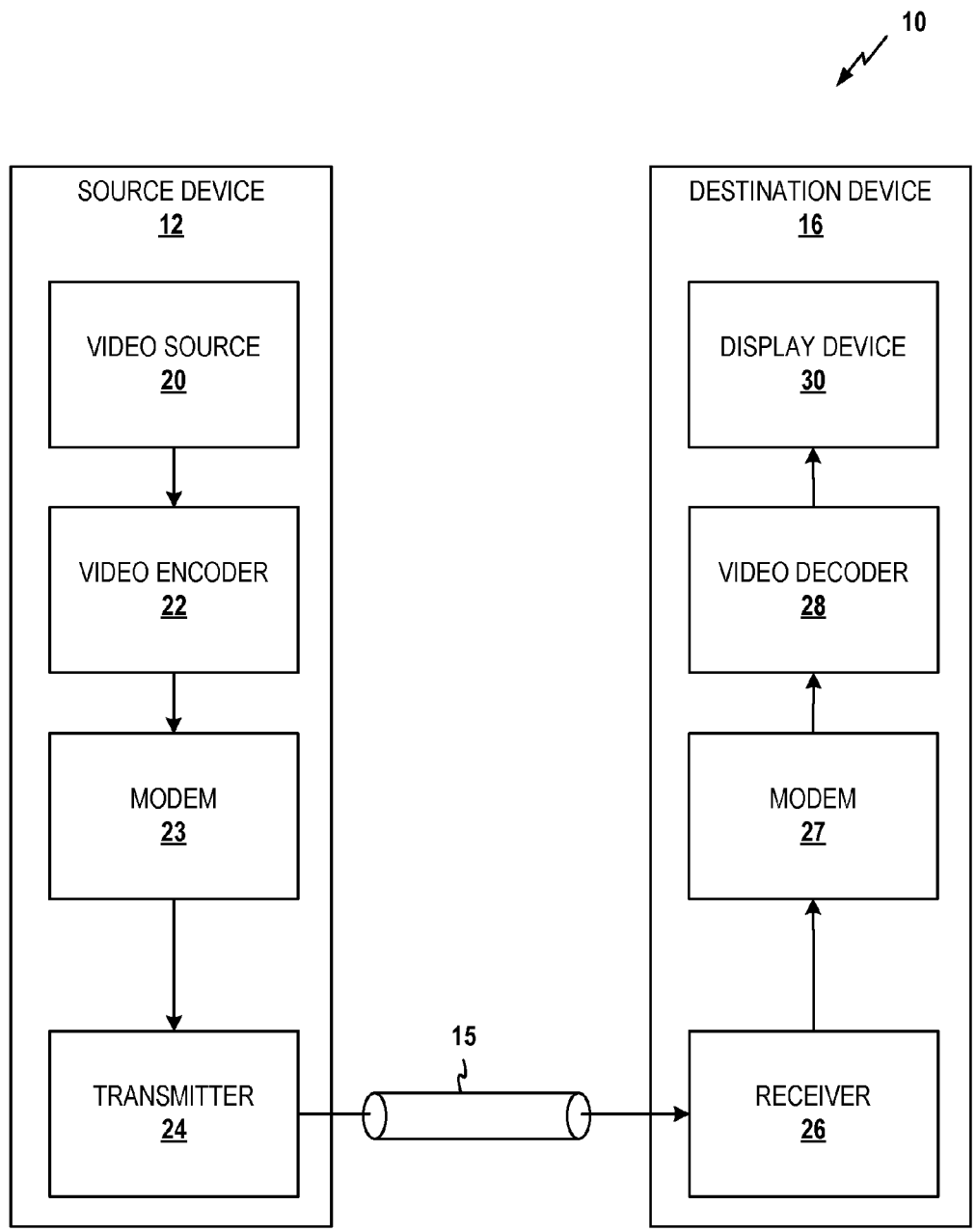
FIG. 1 illustrates a functional block diagram of an exemplary video encoding and decoding system.

In the figures, to the extent possible, elements having the same or similar functions have the same designations.

DETAILED DESCRIPTION

Orientation information for a picture is provided to a display device to allow it to properly display the picture. This information can be made available for pictures regardless of the codec used to encode the picture. A generic solution that is independent of the codec used is desirable. When multiple media streams or pictures are being displayed it may be necessary to indicate the rotation information for the different streams or pictures.

Described herein are various alternative ways for providing picture orientation information that allows a display device to determine the orientation at which a picture was captured so that it can properly orient the picture before displaying it to the user. The picture orientation information includes recommended rotation and its persistency period. A recommended rotation may be a recommended anticlockwise rotation or a recommended clockwise rotation. In the following in this document, it is assumed that a recommended rotation is a recommended anticlockwise rotation. The information may be conveyed from a sender side (e.g., a first fixed or mobile communication device) to a receiver side (e.g., a second fixed or mobile communication device) using in-band transmission, real-time transport protocol control protocol (RTCP), real-time transport protocol (RTP) field (e.g., header), session description protocol (SDP), media presentation description (MPD), or an ISO base media file format box. Upon reception of the picture orientation information, the receiver side may rotate the output picture from the video decoder before the picture is displayed.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and messages may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

FIG. 1 illustrates a functional block diagram of an exemplary video encoding and decoding system. As shown in FIG. 1, system 10 includes a source device 12 that may be configured to transmit encoded video to a destination device 16 via a communication channel 15. Source device 12 and destination device 16 may comprise any of a wide range of devices, including mobile devices or generally fixed devices. In some cases, source device 12 and destination device 16 comprise wireless communication devices, such as wireless handsets, so-called cellular or satellite radiotelephones, personal digital assistants (PDAs), mobile media players, or any devices that can communicate video information over a communication channel 15, which may or may not be wireless. However, the techniques of this disclosure, which concern the picture orientation information, may be used in many different systems and settings. FIG. 1 is merely one example of such a system.

In the example of FIG. 1, the source device 12 may include a video source 20, a video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to encode a sequence of pictures. The video encoder 22 may be configured to encode additional information associated with the pictures such as 3D conversion information including a set of parameters that can be applied to each of the video pictures to generate 3D video data. Modem 23 and transmitter 24 may modulate and transmit wireless signals to destination device 16. In this way, source device 12 communicates the encoded sequence of pictures along with any additional associated information to destination device 16.

Receiver 26 and modem 27 receive and demodulate wireless signals received from source device 12. Accordingly, video decoder 28 may receive the sequence of pictures. The video decoder 28 may also receive the additional information which can be used for decoding the coded sequence of pictures.

Source device 12 and destination device 16 are merely examples of such coding devices in which source device 12 generates coded video data for transmission to destination device 16. In some cases, devices 12, 16 may operate in a substantially symmetrical manner such that, each of devices 12, 16 includes video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. As part of the encoding process, the video encoder 22 may be configured to implement one or more of the methods described herein, such as obtaining picture orientation information identifying the orientation of the camera for portions of the video.

The encoded video information may then be modulated by a modem 23 according to a communication standard, e.g., such as code division multiple access (CDMA) or another communication standard, and transmitted to destination device 16 via transmitter 24. The encoded video information may include the picture orientation information. The modem 23 may include various mixers, filters, amplifiers or other components designed for signal modulation. The transmitter 24 may include circuits designed for transmitting data, including amplifiers, filters, and one or more antennas.

Receiver 26 of destination device 16 may be configured to receive information over channel 15. A modem 27 may be configured to demodulate the information. The video encoding process may implement one or more of the techniques described herein to include picture orientation information. The information communicated over channel 15 may include information defined by video encoder 22, which may be used by video decoder 28 consistent with this disclosure. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Accordingly, modem 23 and transmitter 24 may support many possible wireless protocols, wired protocols or wired and wireless protocols. Communication channel 15 may form part of a packet-based network, such as a local area network (LAN), a wide-area network (WAN), or a global network, such as the Internet, comprising an interconnection of one or more networks. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16. The techniques of this disclosure do not necessarily require communication of encoded data from one device to another, and may apply to encoding scenarios without the reciprocal decoding. Also, aspects of this disclosure may apply to decoding scenarios without the reciprocal encoding.

Video encoder 22 and video decoder 28 may operate consistent with a video compression standard, such as the ITU-T H.264 standard, alternatively described as MPEG-4, Part 10, and Advanced Video Coding (AVC), or the next-generation video coding standard named High Efficiency Video Coding (HEVC). The techniques of this disclosure, however, are not limited to any particular coding standard or extensions thereof. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to a multiplexer protocol (e.g., ITU H.223) or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic circuitry, software executing on a microprocessor or other platform, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video pictures. Video encoder 22 and video decoder 28 may operate on video blocks within individual video pictures in order to encode and decode the video data. The video blocks may have fixed or varying sizes, and may differ in size according to a specified coding standard. Each video picture may include a series of slices or other independently decodable units. Each slice may include a series of macroblocks or other video blocks such as coding tree units, which may be arranged into sub-blocks. As an example, the ITU-T H.264 standard supports intra prediction in various block sizes, such as 16 by 16, 8 by 8, or 4 by 4 for luma components, and 8 by 8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process.

Macroblocks, coding tree units, or other video blocks may be grouped into independently decodable units such as slices, slice groups, tiles, or other independent units. Macroblocks, coding tree units, or other video blocks may be grouped into dependently decodable units such as dependent slices, entropy slices, wavefront parallel processing waves, or other dependent units. Each slice may be an independently decodable unit of a video picture. Alternatively, pictures themselves may be decodable units, or other portions of a picture may be defined as decodable units. In this disclosure, the term "coded unit" refers to any independently decodable unit of a video picture such as an entire picture, a slice of a picture, or another independently decodable unit defined according to the coding techniques used.

Figure 2:
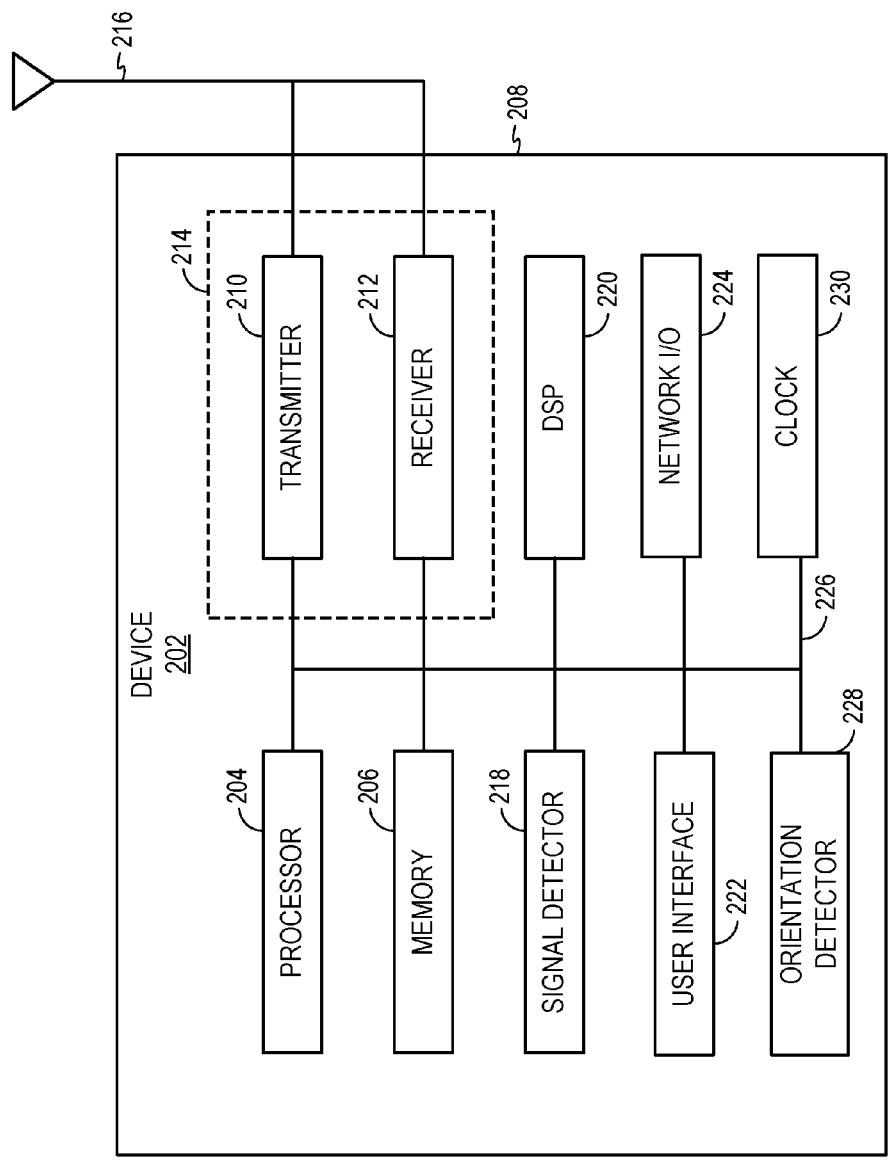
FIG. 2 shows a functional block diagram of an exemplary video processing device.

FIG. 2 shows a functional block diagram of an exemplary video processing device. The device 202 is an example of a device that may be configured to implement the various methods described herein. For example, the device 202 may be implemented as the source device 12 or the destination device 16.

The device 202 may include processor unit(s) 204 which control operation of the device 202. One or more of the processor unit(s) 204 may be collectively referred to as a central processing unit (CPU). Memory 206, which may include both read-only memory (ROM) and random access memory (RAM), provides instructions and data to the processor units 204. The memory 206 may generally be implemented as a computer readable storage medium. A portion of the memory 206 may also include non-volatile random access memory (NVRAM). The processor unit(s) 204 may be configured to perform logical and arithmetic operations based on program instructions stored within the memory 206. The instructions in the memory 206 may be executable to implement the methods described herein.

The processor unit(s) 204 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In an implementation where the processor unit(s) 204 include a DSP, the DSP may be configured to generate a packet (e.g., a data packet) for transmission. In some aspects, the packet may comprise a physical layer data unit (PPDU).

The device 202 may also include machine-readable media for storing software. The processing unit(s) 204 may comprise one or more non-transitory machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor unit(s) 204, cause the device 202 to perform the various functions described herein.

The device 202 may include a transmitter 210 and/or a receiver 212 to allow transmission and reception, respectively, of data between the device 202 and a remote location. The transmitter 210 and receiver 212 may be combined into a transceiver 214. An antenna 216 may be attached to the housing 208 and electrically coupled with the transceiver 214. The device 202 may also include (not shown) multiple transmitters, multiple receivers, multiple transceivers, and/or multiple antennas.

The transmitter 210 may be configured to wirelessly transmit packets and/or signals. For example, the transmitter 210 may be configured to transmit different types of packets generated by the processor unit(s) 204, discussed above. The packets to be transmitted are provided to the transmitter 201. For example, the processor unit(s) 204 may store a packet in the memory 206 and the transmitter 201 may be configured to retrieve the packet. Once the transmitter retrieves the packet, the transmitter 201 transmits the packet to via the antenna 216. In some implementations, the transmitter 201 may transmit the packet via a network input/output 224.

If the device 202 is implemented as a destination device 16, the antenna 216 detects wirelessly transmitted packets/signals. The receiver 212 may be configured to process the detected packets/signals and make them available to the processor unit(s) 204. For example, the receiver 212 may store the packet in memory 206 and the processor unit(s) 204 may be configured to retrieve the packet.

The device 202 may also include a signal detector 218 that may be used in an effort to detect and quantify the level of signals received by the transceiver 214. The device 202 may also include a digital signal processor (DSP) 220 for use in processing signals. The DSP 220 may be configured to generate a packet for transmission. In some aspects, the packet may comprise a physical layer data unit (PPDU).

The device 202 may further comprise a user interface 222 in some aspects. The user interface 222 may comprise a keypad, a microphone, a speaker, and/or a display. In some implementations, the device 202 may be coupled with a display. For example, the device 202 may be implemented as a set-top-box which receives video information, processes the information for display, and transmit the information to a television for display. The user interface 222 may further include any element or component that conveys information to a user of the device 202 and/or receives input from the user. The device 202 may also include a housing 208 surrounding one or more of the components included in the device 202.

The device 202 may include an orientation detector 228. When implemented as a source device 12, the orientation detector 228 may be configured to identify the orientation of the device 220 when the video information is captured. The orientation detector 228 may detect orientation through the use of a gyroscope, magnetic reckoning (e.g., compass), based on the video information (e.g., identifying known landmarks included in the video), geospatial positioning system, laser reckoning (e.g., triangulation, leveling) and/or signals generated by the device 202 indicating orientation of the capture sensor included in the device 202.

When implemented as a destination device 16, the orientation detector 228 may be configured to identify the orientation of the device 220. The orientation of the device 220 may be used to prepare the video information for display. For example, if the device 220 is held in landscape mode (e.g., height of display is less than width of display), the device 220 may adjust the video information to enhance the video display (e.g., crop, scale, rotate). In implementations where the device 220 is coupled with a display, the device 202 may receive orientation information from the coupled display device. The orientation information may be provided to the orientation detector 228 for an orientation determination.

The device 202 may include a clock 230. The clock 230 may be configured to identify a point in time. The clock 230 may identify absolute points in time (e.g., specific date and time information). The clock 230 may be configured to identify relative points in time (e.g., points in a multimedia presentation). The clock 230 may be coupled with the capture sensor included in a source device 12. The clock 230 may provide time information at various points of video capture. This time information may be included in the video information transmitted to the destination device 16.

The various components of the device 202 may be coupled together by a bus system 226. The bus system 226 may include a data bus, for example, as well as a power bus, a control signal bus, and a status signal bus in addition to the data bus. Those of skill in the art will appreciate the components of the device 202 may be coupled together or accept or provide inputs to each other using some other mechanism.

Although a number of separate components are illustrated in FIG. 2, those of skill in the art will recognize that one or more of the components may be combined or commonly implemented. For example, the processor unit(s) 204 may be used to implement not only the functionality described above with respect to the processor unit(s) 204, but also to implement the functionality described above with respect to the signal detector 218. Further, each of the components illustrated in FIG. 2 may be implemented using a plurality of separate elements.

Figure 3:
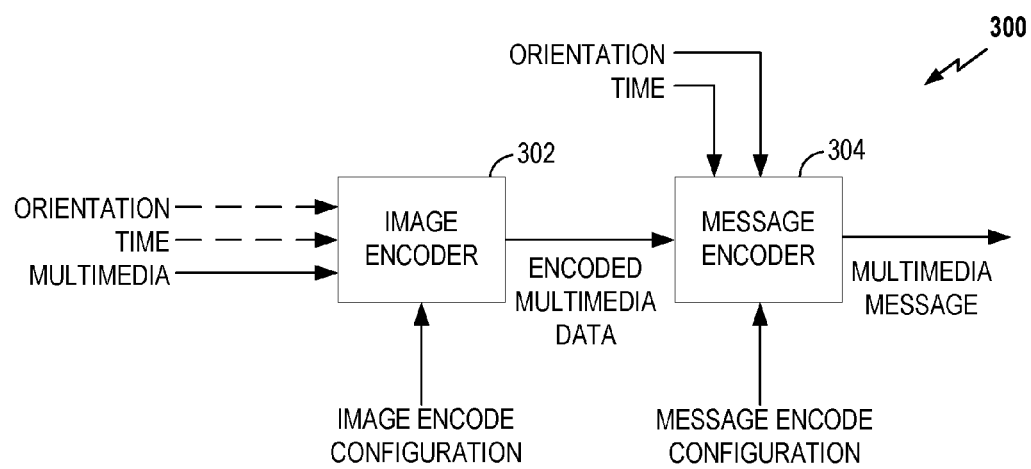
FIG. 3 illustrates a functional block diagram of an exemplary encoding device.

FIG. 3 illustrates a functional block diagram of an exemplary encoding device. The encoding device 300 shown in FIG. 3 receives three inputs: orientation information, time information, and multimedia information. The orientation information may be received from the orientation detector 228. The orientation information may indicate the number of degrees of rotation for the capture sensor. For example, in a sixteen bit representation, the orientation information may be a value from 0 to 65535. Each value may represent steps of 360/65536 of a degree of rotation. In some implementations, eight bits may be used to represent the orientation information. In such implementations, the rotation may be identified in steps of 360/256 of a degree of rotation. Other numbers of bits may be used to represent the orientation information without departing from the scope of the disclosure.

The encoding device 300 includes an image encoder 302. The image encoder 302 shown receives the multimedia data and generates an encoded version of the multimedia data/stream. The image encoder 302 may also receive an image encode configuration input. The image encode configuration input may identify the encoding scheme to be applied. The image encode configuration input may be provided once and used for all multimedia streams. The image encode configuration input may be dynamic and provided for each multimedia stream or for each portion of a multimedia stream. In a dynamic configuration, the image encode configuration may be selected based at least in part on the multimedia information, one or more characteristics (e.g., power, processing capabilities, load) of the source device 12, one or more characteristics (e.g., power, processing capabilities, load, coupling with source device) of the destination device 16, and/or other information available to the source device 12.

The image encoder 302 may be configured to apply the identified encoding scheme to multimedia information to generate an encoded version of the multimedia data. In some implementations, the image encoder 302 may also receive the orientation information and/or time information. The image encoder 302 may be configured to encode the multimedia data based on the orientation information and/or time information. In some implementations, the encoded version of the multimedia data may be further processed by the source device 12 (e.g., encrypted, compressed).

The orientation and time information are provided to a message encoder 304. The encoded multimedia data is also provided to the message encoder 304. The message encoder 304 may generate a multimedia message including the encoded multimedia data and the orientation information.

The message encoder 304 may receive a message encode configuration. The message encode configuration may indicate how the multimedia message is to be generated and/or transmitted. For example, the message encode configuration may indicate the transport protocol for the encoded multimedia. Based on this information, the message encoder 304 may generate the multimedia message such that the orientation information is included in a transport layer portion of the multimedia message and the encoded multimedia data is included in a second portion of the multimedia message.

The message encode configuration input may be provided once and used for all multimedia streams. The message encode configuration input may be dynamic and provided for each multimedia stream or for each portion of a multimedia stream. In a dynamic configuration, the message encode configuration may be selected based at least in part on the multimedia information, one or more characteristics (e.g., power, processing capabilities, load) of the source device 12, one or more characteristics (e.g., power, processing capabilities, load, coupling with source device) of the destination device 16, and/or other information available to the source device 12.

In one implementation, the encoding of the message encoder 304 may include the orientation information in a first portion and the image data in a second portion. For example, the orientation information may be included in a transport layer header field distinct from the image data payload. This can provide faster access to the orientation information without the need to decode the image data to obtain the orientation information.

Figure 4:
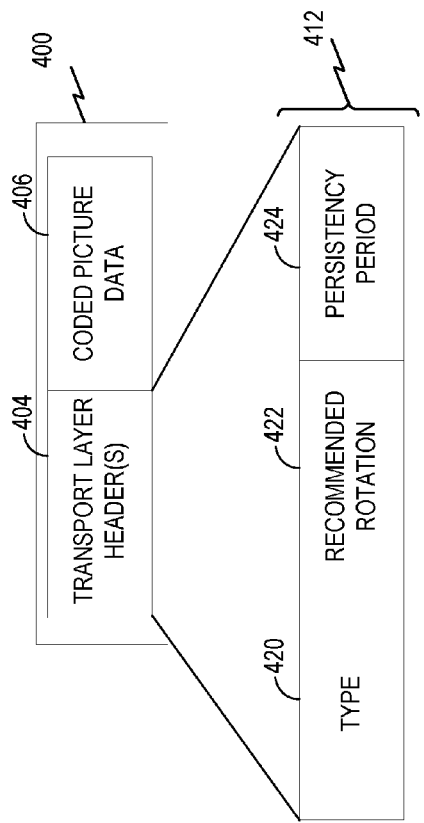
FIG. 4 illustrates a message diagram for an exemplary encoding of picture orientation information.

FIG. 4 illustrates a message diagram for an exemplary encoding of picture orientation information. In some implementations, the picture orientation information may be included in-band with the video data. In such implementations, the picture orientation information is transmitted along with the video data in the message 400.

The picture information (e.g., image) may be transmitted via a coded picture field 406 included in the message 400. The message 400 may also include one or more transport headers 404. One example of a transport layer header is an orientation information header 412. The orientation information header 412 may include a type field 420. The type field 420 may include a value identifying the header type. In the case of orientation information, the type value included in the type field 420 may be associated with orientation information.

Based on the value included in the type field 420, a device receiving the message 400 may determine whether to utilize the information provided for processing picture information. If a device is not configured to perform picture orientation processing, the device may ignore the field if the type is orientation information. If the device is configured to perform picture orientation processing, the device may extract the orientation information from the orientation information header 412 and process the encoded picture(s) accordingly.

As shown in FIG. 4, the orientation information header 412 may include two additional fields. A recommended rotation field 422 may be included to provide a value indicating the rotation for the encoded picture. As discussed above, this may represent a number of degrees of rotation associated with the encoded picture. The recommended rotation field 422 may include sixteen bits, eight bits, four bits, or thirty-two bits depending on the implementation.

A persistency period field 424 may also be included in the payload of a picture orientation supplemental enhancement information field. The persistence period field 424 may include a value indicating the duration for the recommended rotation for the video stream. For example, including a value of 0 may specify that the persistency period end for the recommended rotation is the picture associated with the next picture in decoding order, or the end of the coded video sequence. In such implementations, a value greater than 0 may specify that the persistency period end for the recommended rotation is the picture having picture order count equal to the picture order count of the picture associated with the current picture orientation information plus the value provided in the persistency period field 424, if such a picture is present. If such a picture is not present, the persistency period end may be the end of the coded video sequence. In some implementations, the persistence period starts with the persistence period start, which is the picture associated with the signal 400 including the picture orientation information, and ends with the persistence period end, exclusive, in output order.

In-band transmission of picture orientation information, such as via the message 400, may be applicable to many implementations, but the syntax of the message may be codec-specific. For example, representing the persistency period end, when needed, may be based on something other than picture order count. Other bases for representing the persistency period end may include a picture identifier value of a last picture for which the recommended rotation applies, a value identifying a last group of pictures for which the recommended rotation applies, and the like.

Figure 5:
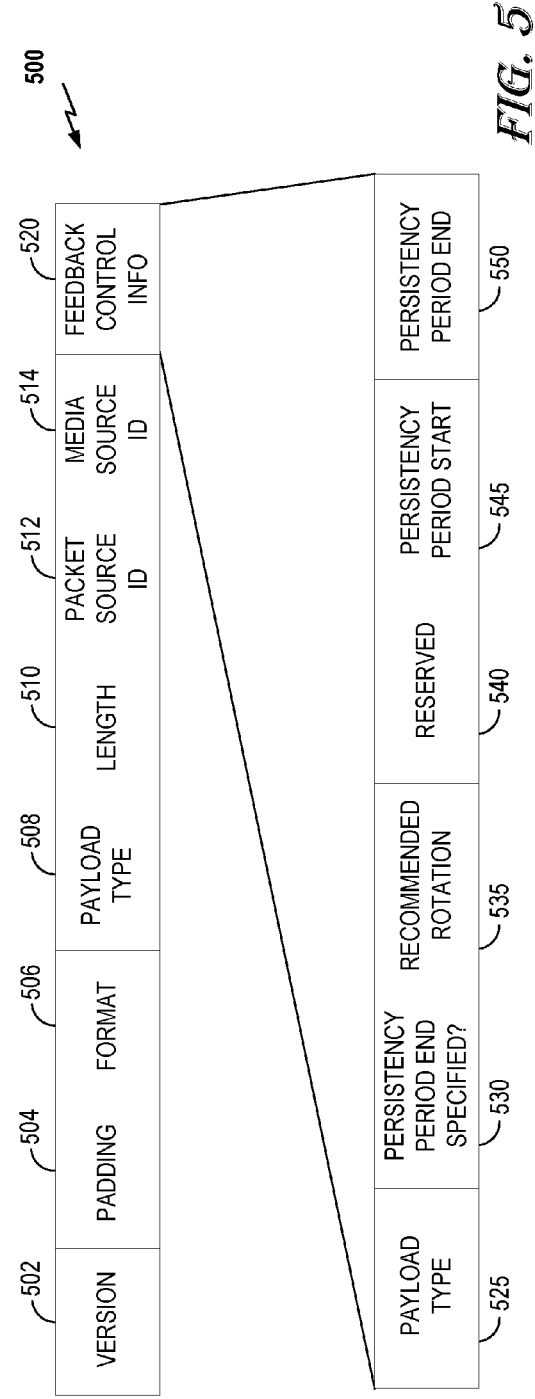
FIG. 5 illustrates a message diagram for another exemplary encoding of picture orientation information.

FIG. 5 illustrates a message diagram for another exemplary encoding of picture orientation information. The format of the message 500 may comply with, for example, feedback message framework of the RTCP standard as specified in RFC 4585. The feedback included in the message 500 may indicate information about a stream of video being transmitted. The message 500 is one example message that can be used for an out-of-band transmission of picture orientation information.

The message 500 may include a version field 502. The version field 502 may include a value indicating which version of a specification was used to generate the message 500. A receiving device may use the version information to determine the proper decoding scheme for the message 500.

The message 500 may include a padding field 504. The padding field 504 may include a value indicating whether the message 500 includes padding bits such as at the end. The message 500 may include a format field 506. The format field 506 may include a value indicating the message format type. The message 500 may include a payload type. For each message format type, one or more payload types may be defined. For example, the payload type may relate to transport layer information or payload-specific information. In such examples, picture orientation information may be associated with payload-specific information.

The message 500 may include a length field 510. The length field 510 includes a value indicating the length of the message 500. The length field 510 may identify a number of bits, a number of bytes, or other pre-determined quantity of data included in the message 500.

The message 500 may include source identification fields. As shown in FIG. 5, the message 500 includes a packet source identifier field 512 and a media source identifier field 514. The packet source identifier field 512 may include a synchronization source identifier of the originator of the message 500. The media source identifier field 514 may include a synchronization source identifier of the media source the message 500 is related to.

The message 500 includes a feedback control information field 520. The feedback control information field 520 may include one or more feedback control messages. In the example as shown in FIG. 5, the feedback control information field 520 includes one feedback control message, namely a picture orientation information feedback control message.

Each feedback control message includes a payload type field 525 and a payload including the feedback control message. The payload may include one or more fields of feedback control information. As shown in FIG. 5, picture orientation information may be included in the payload of a feedback control information message. The control message includes a persistency period end specified field 530. The persistency period end specified field 530 includes a value indicating whether a value is included in the message 500 identifying the end of a rotation recommendation.

The control message includes a recommended rotation field 535. The recommended rotation field 535 specifies the recommended rotation (e.g., the value of the recommended anticlockwise rotation, in units of $360/2^n$ degrees where n is the number of bits included in the recommended rotation field 535), of each output picture within the persistency period as described below. If the recommended anticlockwise rotation is performed before the output picture is displayed, the display would be upside up when the display device is also physically oriented upside up.

The control message may also include a reserved field 540 such as a zero byte. The control message includes a persistency period start field 545. The persistency period start field 545 includes a value specifying the start of the persistency period for the recommended rotation. For example, the persistency period start field 545 may include a value identifying a first picture to which the recommended rotation applies. In some implementations, the value is equal to the RTP timestamp of the first picture in the persistency period. The RTP timestamp for a picture generally refers to the value of the RTP timestamp of an RTP packet if the RTP packet would only contain the coded data of the picture. In some implementations, the value identifying the first picture may be a picture identifier such as picture order count, an offset of the picture identifier value, or the like.

The control message may also include a persistency period end field 550. When present, the persistency period end field 550 specifies the end of the persistency period for the identified recommended rotation. For example, the value included in the persistency period end field 550 may identify the RTP timestamp of the first picture, if any, after the persistency period, in presentation order. If the last picture in the persistency period is the last picture in the session, in presentation order, then the persistency period end field 550 value may be equal to the RTP timestamp of the last picture in the persistency period, in presentation order, plus the presentation duration of the last picture. In some implementations, the value of this field may be equal to the RTP timestamp of the last picture the recommended rotation applies to.

FIG. 6 illustrates a message diagram for a further exemplary encoding of picture orientation information. The format of the message 600 may comply with, for example, the real-time transport protocol standard as specified in RFC 3550 and/or its extension as specified RFC 5285. As such, the message 600 can be used for an out-of-band transmission of picture orientation information.

The message 600 may include a version field 602. The version field 602 may include a value indicating which version of a specification was used to generate the message 600. A receiving device may use the version information to determine the proper decoding scheme for the message 600.

The message 600 may include a padding field 604. The padding field 604 may include a value indicating whether the message 600 includes padding bits such as at the end. The message 600 may include a format field 606. The format field 606 may include a value indicating the message format type. The message 600 may include a payload type. For each message format type, one or more payload types may be defined.

The message 600 may include a sequence number field 610. The sequence number field 610 may be used to identify the message 600 in relation to other packets. The sequence number field 610 may be used by a receiving device to detect packet loss and/or ensure proper order for received packets.

The message 600 may include a timestamp field 612. The timestamp field 612 may include a value identifying an absolute or relative point in time associated with the received video data. The message 600 shown in FIG. 6 includes a source identifier field 614. The source identifier field 614 may include a value identifying a synchronization source identifier of the source stream for the message 600. The message 600 may include one or more contributing source identifiers 618. The contributing source identifiers 618 indicate sources which may contribute content and/or information to the stream associated with the message 600.

The message 600 also includes extension header information. The extension header information may be a one byte header, two byte header, or other quantity of bytes header. In the message 600 shown in FIG. 6, three fields are included for each extension header information element, namely an extension header identifier field 620, an extension header length field 622, and an extension header field 624. The extension header identifier field 620 includes a value identifying the type of extension header information included in this element. The extension header identifier may be specified during session negotiation such as via an extension map (e.g., extmap) attribute. An example extmap attribute is "urn:ietfparams:rtp-hdrext:pict-orient." The extension header length field 622 includes a value indicating the length of the information included in the extension header field 624. The extension header field 624 includes the information associated with extension header identifier.

The extension header field 624 may be used to identify picture orientation information as shown in FIG. 6. The extension header field 624 may include a value identifying the recommended rotation. A device receiving the message 600 may use the timestamp field 612 to identify the starting point for the recommended rotation. In some implementations, the extension header field 624 may include a multi-field value including a recommended rotation field, persistency start period field, persistency end period field, and/or a persistency end specified field, such as described in relation to FIG. 5 above.

If the message 600 does not include an extension header specifying picture orientation information, a receiving device may interpret the picture orientation as zero rotation. In some implementations, if the message 600 does not include an extension header specifying picture orientation information, a receiving device may interpret the picture orientation as the same recommended rotation as a previously received message which included such information.

In some real-time streaming implementations, prior to receiving the message 600, a session may be established between the sending device and a receiver device. In such implementations, the session negotiation messaging may include picture orientation information such as a default recommended rotation for the session. The receiving device may be configured to apply the default recommended rotation unless otherwise specified via subsequent messaging.

Session negotiation may include a session description protocol (SDP) file. The SDP file may be conveyed from a sender side to a receiver side through a transport protocol such as SIP, RTSP, HTTP, and the like. Picture orientation information can be included in the SDP file. For example, the information may be included, in a media-level attribute a=picorientationinfo:<picture orientation information>. The value of <picture orientation information> may include a single value of recommended rotation, in the range of 0 to 65535 (for 16 bit value), inclusive. The recommended rotation may be applied to all pictures the current SDP file is associated with.

The picture orientation information may include one or more sets of recommended rotation, persistency period start, and persistency period end values. The three values of recommended rotation, persistency period start, and persistency period end in each set may be separated by a known delimiter such as a comma ',' or a space ' '. Sets may also be separated by known delimiter such as a semicolon ';'. The persistency period start specifies the value of the RTP timestamp of the first picture in the persistency period. The persistency period end specifies the value of the RTP timestamp of the first picture after the last picture in presentation order the recommended rotation applies to. In some implementations, the persistency period end specifies the value of the RTP timestamp of the last picture in presentation order the recommended rotation applies to.

Specifying picture orientation information via a session description protocol file may be desirable in implementations where it is known, at the beginning of the session, the value of the recommended rotation for any moment of the entire session such as recorded movie streaming. SDP files may also be used in scenarios where the rotation changes in the middle of a session. In this case, the SDP parameters for the session can be re-negotiated to indicate the new orientation. However, this approach incurs some delay due to the SDP re-negotiation process and can there be short periods where the pictures are not displayed with the correct orientation.

The described messages and methods can also be used in RTP based conversational applications as well as streaming, multicast and broadcast applications with the above constraint.

A further example of transmitting picture orientation information is to include the picture orientation information in a media presentation description (MPD) as, for example, in MPEG dynamic adaptive streaming over HTTP (DASH) standard. DASH is an example of a video streaming protocol. In some DASH implementations, an MPD is published to allow clients to identify, obtain, and render the media. The MPD may include uniform resource locators (URLs) along with other information about the media presentation.

A publisher may include picture orientation information in the MPD, which may be a file or a part of a file. For example, a PictureOrientationInfo element, as shown in the example below in Table 1, may be included in an MPD, either at the MPD level (in which case the information applies to all video streams of the Media Presentation), at the Period level (in which case the information applies to all video streams in the Period), at the Adaptation Set level (in which case the information applies to all video streams in the Adaptation Set), at the Representation level (in which case the information applies to all video streams in the Representation), or at the Sub-Representation level (in which case the information applies to all video streams in the Sub-Representation).

The PictureOrientationInfo element provides the picture orientation information. The container element, which may be the MPD element, a Period element, an Adaptation Set element, a Representation element, or a Sub-Representation element, may contain zero or more PictureOrientationInfo elements. Each PictureOrientationInfo element contains a mandatory recommendedRotation attribute, which provides the recommended rotation, an optional persistencyPeriodStart attribute, which provides the persistency period start, and an optional persistencyPeriodEnd attribute, which provides the persistency period end.

The value of the persistencyPeriodStart or persistencyPeriodEnd may be in units based on the timescale attribute included in the MPD. In some implementations, the persistency period information may identify a portion of the media presentation (e.g., a set of pictures, a set of segments, or a set of subsegments).

In some implementations, the textual order of the PictureOrientationInfo elements within the container element matches the increasing presentation time order of the video media samples the PictureOrientationInfo elements apply.

TABLE 1

| Element/Attribute Name | Use | Description |
| --- | --- | --- |
| PictureOrientationInfo | | Specifies the picture orientation information. |
| @recommendedRotation | M | Specifies the Recommended Rotation, which is the value of the recommended anticlockwise rotation, in units of 360/65536 (for 16 bit representations) degrees, of each output picture within the Persistency Period. If the recommended anticlockwise rotation is performed before the output picture is displayed, the display would be upside up when the display device is also physically oriented upside up. |
| @persistencyPeriodStart | OD | Specifies the Persistency Period Start. The value may be equal to the presentation time of the first video sample in the Persistency Period in presentation order. When not present, the value is inferred to be equal to the presentation time of the first video sample of all video samples to which the container element applies in presentation order. |
| @persistencyPeriodEnd | OD | Specifies the Persistency Period End. The value may be equal to the presentation time of the first video sample after the last picture in presentation order the Recommended Rotation applies to. |

TABLE 1-continued

| Element/Attribute Name | Use | Description |
|---|---|---|
| | | When not present, the value is inferred to be equal to the presentation time of the last video sample of all video samples to which the container element applies in presentation order plus the presentation duration of the last video sample. In some implementations, the value of this attribute may be equal to the presentation time of the last picture, in presentation order, the Recommended Rotation applies to. |

Legend:
For attributes: M = Mandatory, O = Optional, OD = Optional with Default Value, Elements are bold; attributes are non-bold and preceded with an @.

A further example of transmitting picture orientation information is to include the picture orientation information in a multimedia file such as according to an ISO base media file format (ISO BMFF). The ISO BMFF generally describes an extensible multimedia file format with various levels of data structures describing information at various levels of granularity (e.g., entire file, groups of pictures, specific picture). The picture orientation information may be included in the sample description entry in a track for a video stream identified in the file. One sample description entry may apply to a set of samples. For each recommended rotation value, the persistency period start and persistency period end are explicitly transmitted. The values for the recommended rotation may be specified as described above. The value of the persistency period start for a recommended rotation may be specified as equal to the decoding time of the first sample, in presentation order, the recommended rotation applies to, and the value of a persistency period end may be specified as equal to the decoding time of the last sample, in presentation order, the recommended rotation applies to. In some implementations, the value of the persistency period start for a recommended rotation may be specified as equal to the presentation time of the first sample, in presentation order, the recommended rotation applies to, and the value of a persistency period end may be specified as equal to the presentation time of the last sample, in presentation order, the recommended rotation applies to. In some implementations, the value of a persistency period end may be specified as equal to the presentation time of the first sample, in presentation order, after the last sample, in presentation order, the recommended rotation applies to. In some implementations, the value of a persistency period end may be specified as equal to the decoding time of the first sample, in presentation order, after the last sample, in presentation order, the recommended rotation applies to.

The Picture Orientation Information may also be conveyed using a new type of sample group, e.g., named 'poif'. Each set of samples for which a particular value of Recommended Rotation applies comprise one sample group of type 'poif'. In the sample group entry, the value of recommended rotation, similar as defined above, is transmitted. A video track may contain zero or more instances of a SampleToGroupBox with a grouping_type 'poif'. Each SampleToGroupBox instance represents the assignment of a set of samples in the track to sample group of type 'poif'. Each sample group of type 'poif' is associated with a sample group description entry of type 'poif' included in an instance of the SampleGroupDescriptionBox with the same grouping type.

In another alternative embodiment, the picture orientation information may be conveyed using a new box. The box may have a type identifying the box as picture orientation information (e.g., 'poif'). The container for the box is the file. The box may be an optional box. One or more instances of picture orientation information boxes may be included. The picture orientation information box can be used to supply picture orientation information for samples in movie fragments, or files containing movie fragments (such as segments).

The picture orientation information box is related to the next movie fragment box that follows it in bitstream order. The box generally follows any segment type or segment index box (if any) in the segment, and occurs before the following movie fragment box (to which it refers). If a segment file contains any picture orientation information boxes, then the first of them preferably occurs before the first movie fragment box in that segment. Table 2 illustrates a sample syntax which may be used to represent a picture orientation box.

TABLE 2

| Field | Description |
|---|---|
| reference track ID | The track_ID for the reference track for which the following picture orientation information is provided. |
| recommended rotation | The recommended rotation, e.g., the value of the recommended anticlockwise rotation, in units of 360/65536 degrees (for 16 bit implementations), of each output picture within the persistency period. If the recommended anticlockwise rotation is performed before the output picture is displayed, the display would be upside up when the display device is also physically oriented upside up. |
| persistence period start present | Flag value indicating the presence/absence of a persistence period start. For example, if equal to 1, the persistence_period_start field is present in this box. And if equal to 0 the persistence_period_start field is not present in this box. |
| persistence period end present | Flag value indicating the presence/absence of a persistence period end. For example, if equal to 1, the persistence_period_end field is present in this box. And if equal to 0 the persistence_period_end field is not present in this box. |
| persistence period start | The sample_number for the first sample to which the recommended rotation applies. When not present, the first sample to which the recommended rotation applies is the first sample following this box in bitstream order. |
| persistence period end | The sample_number for the last sample to which the recommended rotation applies. When not present, the last sample to which the recommended rotation applies is the last sample preceding the next picture orientation information box in bitstream order. |

FIG. 7 illustrates a functional block diagram of an exemplary decoding device. The decoding device 700 may be included in the destination device 16. The decoding device 700 shown includes a transport receiver 701 and a decoder 702.

The transport receiver 701 may be configured to obtain the multimedia message, such as that shown in FIG. 4. The transport receiver 701 may be further configured to obtain the orientation information from a first portion of the multimedia message and the encoded multimedia data from a second portion of the multimedia message. The transport receiver 701 may provide the encoded multimedia data to the decoder 702. The transport receiver 701 may also provide the orientation information to a display preprocessor 704 and, optionally, to the decoder 702.

The decoder 702 may receive the encoded multimedia data. The encoded multimedia data may be encoded in one or more of the ways described above. The decoder 702 may optionally receive the orientation information. The orientation information may be used as part of the decoding process.

The decoder 702 may also receive a decode configuration input. The decode configuration input may identify the decoding scheme to be applied. The decode configuration input may be provided once and used for all multimedia streams. The decode configuration input may be dynamic and provided for each encoded multimedia data. In a dynamic configuration, the decode configuration may be selected based at least in part on the received multimedia data, one or more characteristics of the source device 12 (e.g., power, processing capabilities, load), one or more characteristics (e.g., power, processing capabilities, load, coupling with source device) of the destination device 16, and/or other information available to the destination device 16.

The decoder 702 provides as outputs the decoded information which may include time information and the multimedia data. As shown in FIG. 7, the outputs may be provided to a display preprocessor 704. The display preprocessor 704 may be configured to adjust the orientation of the multimedia data based at least in part on the orientation information, the decoded time information, and/or the decoded multimedia. The display preprocessor 704 may also receive picture orientation information from other modules not depicted other than the decoder 702.

The display preprocessor 704 may also receive a display configuration input. The display configuration input may include values such as an orientation for the target display, dimensions of the target display, a preference for whether to rotate, and the like. Accordingly, the display preprocessor 704 may selectively rotate the output picture from the video decoder before the picture is displayed, depending on the user preference, system configuration, or the orientation of the display device itself. For example, if the sender side indicates that the orientation should be rotated 50 degrees counter-clockwise and the display preprocessor 704 detects that the target display is already rotated 40 degrees counter-clockwise (from vertical), then the display preprocessor 704 could determine that it does not have to rotate the picture prior to displaying it. Additional display preprocessing may include color correction, time correction, aspect correction, scaling, and/or cropping the output picture to fit the target display size.

Figure 8:
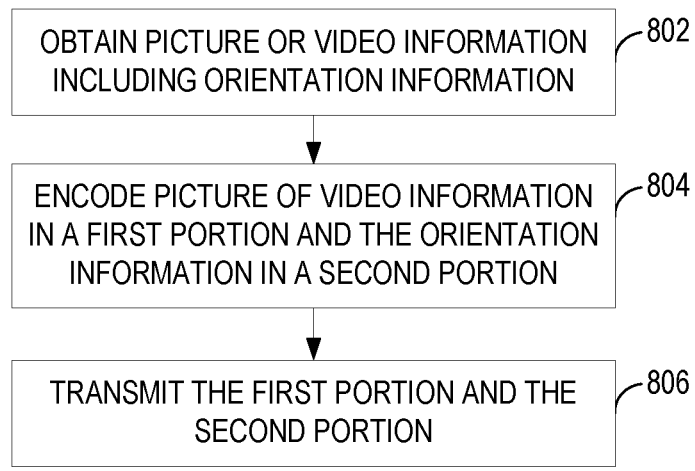
FIG. 8 illustrates a process flow diagram for a method of transmitting media information.

FIG. 8 illustrates a process flow diagram for a method of transmitting media information. The method may be implemented in one or more of the devices described herein. For example, the source device 12 may be configured to perform one or more aspects of the method shown.

At block 802, picture or video information is obtained, the picture or video information including image data and orientation information of a media capture unit when the picture or video information is obtained along with orientation information. At block 804, the obtained information is encoded. The orientation information may be included in a first portion and the image data may be included in a second portion. In some implementations, the second portion is encoded and the first portion being distinct from the second portion. The encoding may be performed by an encoding device 300 such as that shown in FIG. 3. The encoding may be include one or more of the messages described above, such as in FIGS. 4-6. At block 806, the first and second portions are transmitted. The transmission may be wired or wireless. The transmission may be directly to a destination device or via one or more intermediaries.

Figure 9:
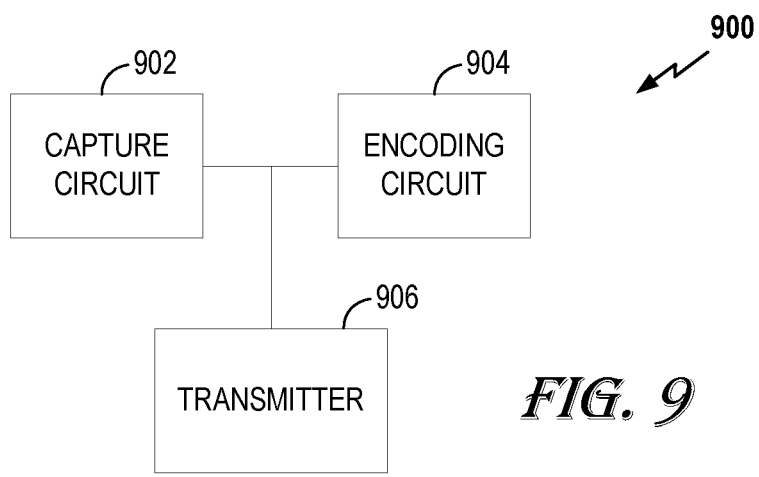
FIG. 9 illustrates a function block diagram of an exemplary apparatus for transmitting media information.

FIG. 9 illustrates a function block diagram of an exemplary apparatus for transmitting media information. Those skilled in the art will appreciate that a media information transmitting apparatus may have more components than the simplified apparatus 900 shown in FIG. 9. The apparatus 900 shown includes only those components useful for describing some prominent features of implementations within the scope of the claims. The apparatus 900 includes a capture circuit 902, an encoding circuit 904, and a transmitter 906.

The capture circuit 902 is configured to obtain picture or video information, the picture or video information including orientation information of a media capture unit when the picture or video information is obtained. The capture circuit 902 may include one or more of an image sensor, a camera, a microphone, an orientation detector, a clock, a processor, and a memory. In some implementations, the means for obtaining picture or video information may include the capture circuit 902.

The encoding circuit 904 is configured to encode captured picture or video information. The orientation information may be included in a first portion and the image data may be included in a second portion, the second portion being encoded and the first portion being distinct from the second portion. The encoding circuit 904 may be configured to encode in accordance with one or more of the techniques described above. The encoding circuit 904 may include one or more of an encoder device, a comparator, a memory, a processor, a tokenizer, and a sequence generator. In some implementations, the means for encoding picture or video information may include the encoding circuit 904.

The transmitter 906 is configured to transmit the first portion and the second portion. The transmitter 906 may be configured for wired or wireless transmission. The transmitter 906 may include one or more of an antenna, a signal generator, a power source, an amplifier, a network interface, a processor, and a memory. In some implementations, the means for transmitting encoded picture or video information may include the transmitter 906.

Figure 10:
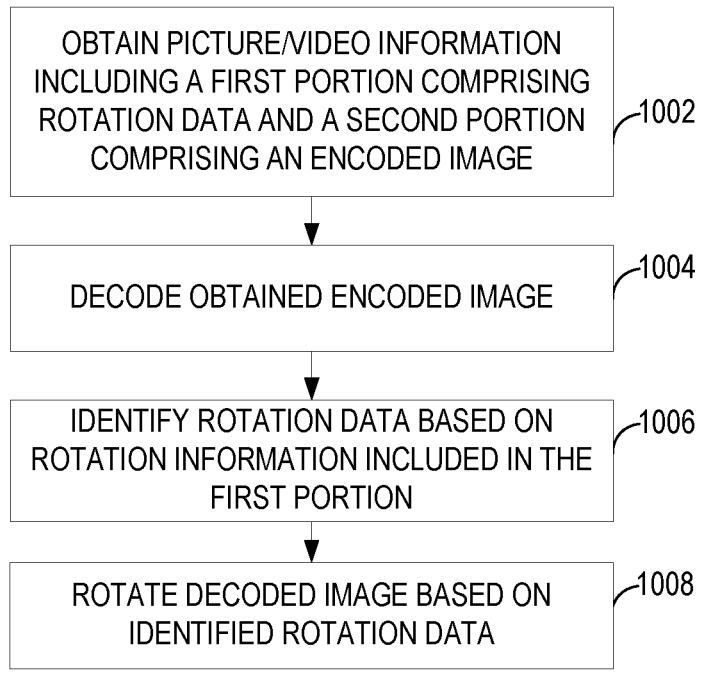
FIG. 10 illustrates a process flow diagram for a method of displaying media information.

FIG. 10 illustrates a process flow diagram for a method of displaying media information. The method may be implemented in one or more of the devices described herein. For example, the destination device 16 may be configured to perform one or more aspects of the method shown.

At block 1002, picture or video information including at least one output picture is obtained. The stored picture or video information may be encoded as described above including rotation information and encoded image data in respective portions of the message including the picture or video information. At block 1004, the obtained encoded image data is decoded. At block 1006, rotation data and a period for the rotation data are identified. At block 1008, a version of the decoded output picture is generated based on the identified rotation data and the identified period.

Figure 11:
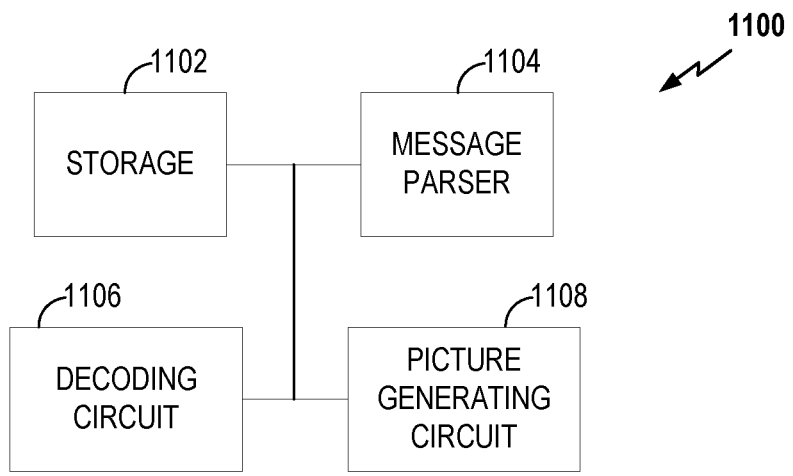
FIG. 11 illustrates a function block diagram of an exemplary apparatus for displaying media information.

FIG. 11 illustrates a function block diagram of an exemplary apparatus for displaying media information. Those skilled in the art will appreciate that a media information displaying apparatus may have more components than the simplified apparatus 1100 shown in FIG. 11. The apparatus 1100 shown includes only those components useful for describing some prominent features of implementations within the scope of the claims. The apparatus 1100 includes a receiver 1102, a message parser 1104, a decoding circuit 1106, and a picture generating circuit 1108.

The receiver 1102 is configured to obtain picture or video information, the picture or video information including at least one output picture. The receiver 1102 may include one or more of a memory, an antenna, a signal processor, a network interface, and a demodulator. In some implementations, means for obtaining picture or video information includes the receiver 1102.

The message parser 1104 is configured to extract the rotation data and a period for the rotation data from the rotation information and to extract the encoded output picture from the obtained picture of video information. The message parser 1104 may include one or more of a comparator, a memory, a processor, and an adder. In some implementations, means for identifying rotation information includes the message parser 1104.

The decoding circuit 1106 is configured to decode the encoded output picture included in the picture or video information. The decoding circuit 1106 may include one or more of a decoding device, a comparator, a memory, a processor, and a tokenizer. In some implementations, means for decoding an output picture includes the decoding circuit 1106.

The picture generating circuit 1108 is configured to generate a version of the decoded at least one output picture for display based on the identified rotation data and the identified period. The picture generating circuit 1108 may include one or more of a comparator, a memory, a processor, a pixel generator, a scaling circuit, a cropping circuit, and an adder. In some implementations, means for processing transport layer information includes the picture generating circuit 1108.

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Similarly, the messages described above include one or more fields which may be used in various implementations.

The messages may include additional fields, fewer fields, and/or alternative field arrangements without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by an encoding device and/or decoding device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for transmitting media information, the method comprising:
    obtaining image data and orientation information of a media capture unit when the image data is obtained;
    encoding said image data and said orientation information to generate picture or video information, wherein the orientation information is included in a header portion of the picture or video information and the image data is included in a picture field portion of the picture or video information, the picture field portion being encoded and the header portion being distinct from the picture field portion, wherein the orientation information included in the header portion includes rotation data and a period for the rotation data, the period for the rotation data being identified based on a start time stamp of a picture to which the rotation applies, the start time stamp included in a start field, and an end time stamp of a picture after the end of the rotation period, the end time stamp included in an end field; and
    transmitting the picture or video information.

2. The method of claim 1, wherein the header portion is transmitted in-band with the picture field portion.

3. The method of claim 1, wherein the header portion is transmitted out-of-band with the picture field portion.

4. The method of claim 1, wherein the header portion includes a picture orientation information element of a real time transport protocol message.

5. The method of claim 1, wherein the header portion includes one or more attributes included in a session description protocol file.

6. The method of claim 5, wherein transmitting the header portion includes transmitting the header portion via one or more of session initiation protocol, real time streaming protocol, and hypertext transfer protocol.

7. The method of claim 1, wherein the header portion is included in a media presentation description.

8. The method of claim 7, wherein the header portion identifies a period of rotation for all or a sub-grouping of video streams of a media presentation associated with the media presentation description.

9. The method of claim 8, wherein the sub-grouping comprises at least one of a media presentation level grouping, a period level grouping, an adaptation set level grouping, a representation level grouping, and a sub-representation level grouping.

10. The method of claim 1, wherein the header portion is included in one or more entries in an ISO base media file.

11. The method of claim 10, wherein the one or more entries includes a sample description entry in a track associated with the picture or video information.

12. The method of claim 10, wherein the one or more entries includes a picture orientation information sample group entry.

13. The method of claim 10, wherein the one or more entries include a picture orientation information box entry, the box entry associated with at least a portion of the picture or video information.

14. The method of claim 1, wherein the media capture unit comprises at least one of a memory, a camera, a video source, a fixed picture capturing device, and a mobile device.

15. An apparatus for transmitting media information, the apparatus comprising:
    a media capture unit configured to obtain image data and orientation information of a device capturing the image data when the image data is captured;
    an encoder configured to encode said image data and said orientation information to generate picture or video information, wherein the orientation information is included in a header portion of the picture or video information and the image data is included in a picture field portion of the picture or video information, the picture field portion being encoded and the header portion being distinct from the picture field portion, wherein the orientation information included in the header portion includes rotation data and a period for the rotation data, the period for the rotation data being identified based on a start time stamp of a picture to which the rotation applies, the start time stamp included in a start field, and an end time stamp of a picture after the end of the rotation period, the end time stamp included in an end field; and a transmitter configured to transmit the picture or video information.

16. The apparatus of claim 15, wherein the header portion is transmitted in-band with the second portion.

17. The apparatus of claim 15, wherein the header portion is transmitted out-of-band with the second portion.

18. The apparatus of claim 15, wherein the header portion includes a picture orientation information element of a real time transport protocol message.

19. The apparatus of claim 15, wherein the header portion includes one or more attributes included in a session description protocol file.

20. The apparatus of claim 19, wherein transmitting the header portion includes transmitting the header portion via one or more of session initiation protocol, real time streaming protocol, and hypertext transfer protocol.

21. The apparatus of claim 15, wherein the header portion is included in a media presentation description.

22. The apparatus of claim 21, wherein the header portion identifies a period of rotation for all or a sub-grouping of video streams of a media presentation associated with the media presentation description.

23. The apparatus of claim 22, wherein the sub-grouping comprises at least one of a media presentation level grouping, a period level grouping, an adaptation set level grouping, a representation level grouping, and a sub-representation level grouping.

24. The apparatus of claim 15, wherein the header portion is included in one or more entries in an ISO base media file.

25. The apparatus of claim 24, wherein the one or more entries includes a sample description entry in a track associated with the picture or video information.

26. The apparatus of claim 24, wherein the one or more entries includes a picture orientation information sample group entry.

27. The apparatus of claim 24, wherein the one or more entries include a picture orientation information box entry, the box entry associated with at least a portion of the picture or video information.

28. The apparatus of claim 15, the media capture unit comprises at least one of a memory, a camera, a video source, a fixed picture capturing device, and a mobile device.

29. A non-transitory computer readable storage medium comprising instructions executable by a processor of an apparatus, the instructions causing the apparatus to:

obtain image data and orientation information of a media capture unit when the picture or video information is obtained;

encode said image data and said orientation information to generate picture or video information, wherein the orientation information is included in a header portion of the picture or video information and the image data is included in a picture field portion of the picture or video information, the picture field portion being encoded and the header portion being distinct from the picture field portion, wherein the orientation information included in the header portion includes rotation data and a period for the rotation data, the period for the rotation data being identified based on a start time stamp of a picture to which the rotation applies, the start time stamp included in a start field, and an end time stamp of a picture after the end of the rotation period, the end time stamp included in an end field; and transmit the picture or video information.

30. An apparatus for transmitting media information, the apparatus comprising:

means for obtaining image data and orientation information of a media capture unit when the picture or video information is obtained;

means for encoding said image data and said orientation information to generate picture or video information, wherein the orientation information is included in a header portion of the picture or video information and the image data is included in a picture field portion of the picture or video information, the picture field portion being encoded and the header portion being distinct from the picture field portion, wherein the orientation information included in the header portion includes rotation data and a period for the rotation data, the period for the rotation data being identified based on a start time stamp of a picture to which the rotation applies, the start time stamp included in a start field, and an end time stamp of a picture after the end of the rotation period, the end time stamp included in an end field; and means for transmitting the picture or video information.

* * * * *